(12) United States Patent
Moiroux et al.

(10) Patent No.: US 7,231,547 B2
(45) Date of Patent: Jun. 12, 2007

(54) DATA PROCESSING SYSTEM AND METHOD FOR DATA TRANSFER TO A NON-VOLATILE MEMORY IN CASE OF POWER FAILURE

(75) Inventors: Jean-Paul Moiroux, Los Altos, CA (US); Paul Neuman, Claix (FR); Yann Stephan, Joliot-Curie (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 10/424,797

(22) Filed: Apr. 29, 2003

(65) Prior Publication Data
US 2003/0229776 A1    Dec. 11, 2003

(30) Foreign Application Priority Data
Apr. 29, 2002   (EP)   ................... 02354074

(51) Int. Cl.
G06F 11/00    (2006.01)
(52) U.S. Cl. ..................................... 714/24
(58) Field of Classification Search .................. 714/24
See application file for complete search history.

(56) References Cited

U.S. PATENT DOCUMENTS

| | | | | |
|---|---|---|---|---|
| 4,814,971 A | * | 3/1989 | Thatte ......................... | 714/15 |
| 4,907,150 A | * | 3/1990 | Arroyo et al. ............... | 713/323 |
| 5,193,176 A | * | 3/1993 | Brandin ........................ | 714/14 |
| 5,291,600 A | * | 3/1994 | Lutz et al. .................... | 714/15 |
| 5,530,877 A | * | 6/1996 | Hanaoka ...................... | 713/300 |
| 5,535,399 A | * | 7/1996 | Blitz et al. ...................... | 714/6 |
| 5,551,043 A | * | 8/1996 | Crump et al. ................ | 713/323 |
| 6,065,123 A | | 5/2000 | Chou et al. | |
| 6,108,792 A | * | 8/2000 | Hanaoka ...................... | 713/323 |
| 6,145,068 A | * | 11/2000 | Lewis .......................... | 711/170 |

(Continued)

FOREIGN PATENT DOCUMENTS
EP    0793175    9/1997

*Primary Examiner*—Bryce P. Bonzo
(74) *Attorney, Agent, or Firm*—Foley & Lardner LLP

(57) ABSTRACT

The present invention relates to a method of operating a data processing system, having a system context, comprising a first storage medium having a current system memory context, which includes data relating to the system context, and a second non-volatile storage medium; the system being operable in a plurality of states, each state having an associated level of system power consumption; and a power management system for saving the current system memory context to the second non-volatile storage medium in preparation for entering at least one of the plurality of states; the method comprising the steps of: storing an indication of whether the system has been shutdown correctly or incorrectly; outputting, during a working state of the plurality of states, data representing at least a portion of the current system memory context for storage on the second storage medium; determining, upon initialisation of the system, from the indication of whether the data processing system was shutdown correctly or incorrectly that the data processing system was shutdown incorrectly and recovering, in response to that determination, the data from the second storage medium and restoring the system memory context using the recovered data.

11 Claims, 2 Drawing Sheets

U.S. PATENT DOCUMENTS

| | | | |
|---|---|---|---|
| 6,212,642 B1 * | 4/2001 | Seiler et al. | 713/324 |
| 6,389,556 B1 * | 5/2002 | Qureshi | 714/15 |
| 6,393,584 B1 * | 5/2002 | McLaren et al. | 714/14 |
| 6,615,364 B1 * | 9/2003 | Nagasuka et al. | 714/5 |
| 6,915,449 B2 * | 7/2005 | Bantz et al. | 714/15 |
| 2006/0146633 A1 * | 7/2006 | Atri et al. | 365/226 |

* cited by examiner

DATA PROCESSING SYSTEM AND METHOD FOR DATA TRANSFER TO A NON-VOLATILE MEMORY IN CASE OF POWER FAILURE

FIELD OF THE INVENTION

The present invention relates to a data processing system and method, and, more particularly, to a back-up system and method.

BACKGROUND TO THE INVENTION

Crucial to the correct operation and functioning of computer systems are both the operating system and initialisation files. The operating system includes a large number of files that are used to perform various functions. For example, the call kernel32.dll handles memory management, input/output operations and interrupts. The ini files of a computer system are used to initialise software applications upon launch. Since the integrity of such files plays a significant part in the correct functioning of a computer system is it important that they do not become corrupted.

In use, the operating system, the dlls and ini files are copied into main memory, where they can be readily invoked. From time to time, computer systems are known, for whatever reason, to crash. If a computer crashes, it invariably needs to be re-booted. During a re-boot, following a crash, the OS loading sequence will detect that a clean shutdown was not performed and will instigate a recovery process, which checks, and ensures, the integrity of the HDD. However, it is possible, in some circumstances, for the dlls and the ini files, stored on the HDD, to become corrupted when the computer system crashes, especially if they were open at the time of the crash. If one of the more critical dlls or ini files is corrupted during such a crash, the user may not be able to load the operating system or key programs. Clearly, such a situation would be undesirable.

Still further, restoring the integrity of the HDD following an unclean shutdown takes a considerable period of time. This period of time increases with increasing storage capacity of the HDD.

It is an object of the present invention at least to mitigate some of the problems of the prior art.

SUMMARY OF THE INVENTION

Accordingly, a first aspect of the present invention provides a method of operating a data processing system, having a system context, comprising a first storage medium having a current system memory context, which includes data relating to the system context, and a second non-volatile storage medium; the system being operable in a plurality of states, each state having an associated level of system power consumption; and a power management system for saving the current system memory context to the second non-volatile storage medium in preparation for entering at least one of the plurality of states; the method comprising the steps of: storing an indication of whether the system has been shutdown correctly or incorrectly; outputting, during a working state of the plurality of states, data representing at least a portion of the current system memory context for storage on the second storage medium; determining, upon initialisation of the system, from the indication of whether the data processing system was shutdown correctly or incorrectly that the data processing system was shutdown incorrectly and recovering, in response to that determination, the data from the second storage medium and restoring the system memory context using the recovered data.

Advantageously, embodiments of the present invention use the power management system of Advanced Configuration and Power Interface (ACPI) compliant computer systems to realise a method of recovering from corruption of an operating system. Still further, as many applications do not have an intrinsic back-up mechanism, embodiments of the present invention provide a back-up mechanism from which data, that ordinarily would be lost in the event of a system crash, can be recovered.

Preferred embodiments provide a method of operating a data processing system in which the step of outputting data representing at least the portion of the current system memory context comprises the step of outputting, using the power management system, the data representing at least the portion of the current system memory context. Again, it can be appreciated that the ACPI aspects of a computer system are used to provide a back-up mechanism that can be used, in the event of a system crash, to recover data and applications as well as the operating system itself.

System crashes are unpredictable. Suitably, embodiments provide a method of operating a computer system further comprising the step of establishing a schedule for executing the step of outputting data representing at least the portion of the current system memory context and executing the step of outputting according to that schedule. Outputting the system memory context at regular intervals or according to a predetermined schedule will mitigate the effect of any crash upon the amount of data lost.

Preferred embodiments provide a method further comprising the step of invoking the step of outputting the data representing at least the portion of the current system memory context at least twice during a working state. Alternatively, or additionally, embodiments provide a method further comprising the step of invoking the step of outputting the data representing at least the portion of the current system memory context at least twice before entering a reduced power consumption state.

It will be appreciated that the embodiments of the present invention allow a software back-up method and system to be realised in which the system memory context comprises at least one of an operating system, an application or data associated with the operating system or application.

A second aspect of the present invention provides a data processing system, having a system context, comprising a first storage medium having a current system memory context, which includes data relating to the system context, and a second non-volatile storage medium; the system being operable in a plurality of states, each state having an associated level of system power consumption; and a power management system to save the system memory context to the second non-volatile storage medium in preparation for entering at least one of the plurality of states; the system further comprising means to store an indication of whether the system has been shutdown correctly or incorrectly; means to output, during a working state of the plurality of states, data representing at least a portion of the current system memory context for storage on the second storage medium; means to determine, upon initialisation of the system, from the indication of whether the system was shutdown correctly or incorrectly that the system was previously shutdown incorrectly and means, responsive to that determination, to recover the data from the second storage medium and means to restore the system memory context using the recovered data.

Preferred embodiments provide a data processing system in which the means for outputting data representing at least the portion of the current system memory context comprises the power management system.

Embodiments provide a data processing system further comprising means to establish a schedule for invoking the means to output the data representing at least the portion of the current system memory context and means to invoke the means to output the data representing at least the portion of the current system memory context according to that schedule.

Preferably, embodiments provide a data processing system further comprising means to invoke, at least twice during a working state, the means to output the data representing at least the portion of the current system memory context. Alternatively, or additionally, embodiments provide a computer system further comprising means to invoke the means to output the data representing at least the portion of the current system memory context at least twice before entering a reduced power consumption state.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
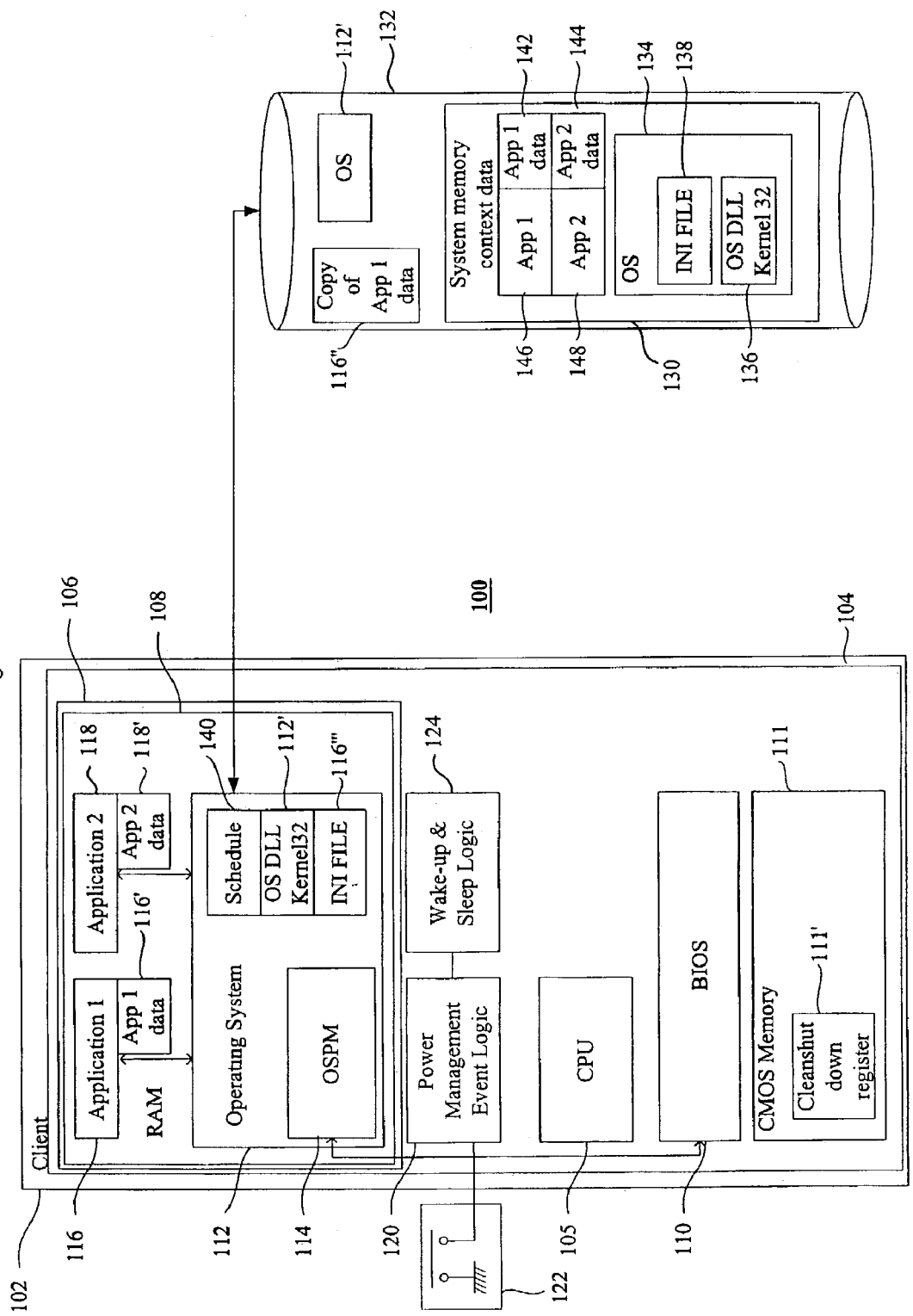
FIG. 1 shows schematically a computer system according to an embodiment.

FIG. 1 illustrates schematically a computer system 100 within which ACPI specification power management, and hence operating system, application and data back-up and recovery, can be realised. The computer system 100 comprises a client machine 102 having a system context 104, a processor 105 and a RAM 106 having a RAM image 108. The RAM image 108 comprises the content of the RAM 106. Conventionally, in preparation for entering a reduced power consumption state, in which some or all of the devices (not shown) of the client machine 102 may be powered-down or placed in a reduced power consumption state, the device register values (not shown) are transferred from the devices into RAM 106 to form part of the RAM image 108. The device register values that are saved to RAM 106 are those values that would be lost in a reduced power consumption state. The RAM image 108, together with the device register values, are known as the system memory context.

The client machine 102 has a boot-time routine 110 that supports ACPI routines. For example, the client machine 102 may have an ACPI compliant BIOS. The BIOS 110 performs various functions including the POST.

The client machine 102 has an operating system 112, which is arranged to implement operating system directed power management (OSPM) using OSPM software 114. The OSPM 114 is arranged to place the client machine 102 in one of number of power states, each having a predetermined power consumption, according to prevailing circumstances. The operating system 112 is conventionally loaded from a predetermined place on an HDD 130, that is, the HDD stores a copy 112' of the operating system. An example of a dll file 112', Kernel32.dll, associated with the operating system is illustrated.

The client machine 102 may also run various applications 116 and 118, which respectively have associated data 116' and 118'. The operating system 112 also uses ini files to initialise the applications 116 and 118 when launched. An example of such an ini file 116''' for application 116 is schematically shown in FIG. 1. It can be appreciated from FIG. 1 that the first application 116 is provided with an automatic back-up arrangement, which automatically saves a copy of its data 116' on the HDD 130 as a back-up copy 116'' of that data. The second application 118 is shown, for illustrative purposes only, as not having an inherent back-up facility. Therefore, no copy is made of the data 118' on the HDD 132 by the application 118.

Additional hardware and software functionality is provided in the form of power management event detection logic 120, which detects events in response to which the current power state of the computer system may change to another state. For example, the user may depress an ON button 122, in which case the computer system may effect a transition from a current sleeping state to a working state. Alternatively, the user may instigate a software shutdown of the client machine 102 in response to which the OSPM software 114 may effect a transition from the current state to a sleeping state.

The events that the power management event detection logic 120 may detect also include, for example, modem or other communication device related events, which signal to the power management event detection logic 120 that data is being received and the modem or communication device and the RAM should be suitably powered-up to allow reception of that data. The power management event detection logic 120 forwards notification of detected events to the wake-up and sleep logic 124. The wake-up and sleep logic 124, in conjunction with the OSPM software 114, in preferred embodiments, manages the preservation of the system memory context of the client machine 102. This, in turn, preserves the system context of the client machine 102.

The data 130 representing the system memory context may be optionally compressed using a codec (not shown) before storage. The data 130 is stored on the non-volatile storage medium such as, for example, the HDD 132. The data 130 can be retrieved in response to a request from the client machine 102. Once the requested data has been retrieved from the HDD 132, the OSPM software 114 uses the retrieved data to restore or establish the system memory context, which, in turn, can be used to restore the system context 104 of the client machine 102.

In the embodiments, the OSPM 114 is arranged during the working mode, S0, to save the system memory context to the HDD 132 either periodically or according to a prescribed time-table 140 or both. Therefore, the system memory context data 130 stored on the HDD 132 is regularly updated. It will be appreciated that copies 142 and 144 of the data 116' and 118' associated with the applications 116 and 118 will also be regularly saved to the HDD 132 as part of the saved system memory context as will copies 146 and 148 of the applications 116 and 118. Furthermore, since the memory resident copy 112 of the operating system also forms part of the system memory context, an additional copy 134 of the operating system is also preserved periodically or saved according to the prescribed time-table 140. It can be seen that the OS dll 112' and the ini file 116''' are also preserved in the form of respective copies 136 and 138 on the HDD 132.

A further function performed by the BIOS 110 is to maintain an indication in a CMOS memory 111 of whether or not the client machine 102 performed a clean shutdown. The indication preferably manifests itself in the form of a CMOS shutdown register 111', or clean shutdown bit, which provides an indication of whether or not the client machine 102 was correctly shutdown. At power-up or during the POST, the BIOS 110 examines the CMOS register 111' to determine if the client machine 102 had been previously shutdown correctly. If the determination is positive, the POST continues as usual. However, in the prior art, if the determination is negative, the BIOS 110 performs a disk recovery process to place the HDD in a consistent state, that is, action is taken to maintain or re-establish the integrity of the HDD and to load the OS. This may not be possible if the crash or last shutdown resulted in a corrupted operating system 112", dlls of that OS 112' or corrupted ini files on the HDD. In contrast, embodiments of the present invention, if the determination is negative, locate the data 130 representing the system memory context on the HDD 132 and load that data 130. The system memory context 130 will contain a snap-shot of the most recent state of the client machine 102 before the crash.

It will be appreciated that the system context memory data 130 would then be used by the BIOS 110 to establish the system context 104 of the client machine 102. Therefore, the applications 116 and 118 together with their data 116' and 118' are restored as well as the operating system 112, which, more likely than not, will not have suffered any corruption that was suffered by the HDD copy 112' of the operating system. Furthermore, the application 118, which does not have inherent back-up capabilities, as a consequence of embodiments of the present invention, is provided with a back-up mechanism by which the associated data 118' can be recovered in the event of a crash or unexpected power-outage.

Alternatively, rather than the BIOS 110 determining that there was an unclean shutdown and, in response, recovering the system memory context 130 from the HDD 132, the BIOS 110 may continue as normal, complete the POST and then attempt to boot strap the operating system 112 from the conventional copy 112' of the operating system stored on the HDD 132. If the boot strapping process fails and the operating system cannot be loaded, for whatever reason, the BIOS 110 is arranged to locate the system memory context data 130 and to perform the above processing to load the operating system from that system memory context data 130. A still further refinement of the above process is for the boot strapping process to have failed because of a predetermined reason or reasons, such as, for example, the above identified corrupted dlls or ini files, and for the BIOS 110 to perform the above processing in response to a determination that the operating system failed to load for at least one of the predetermined reasons.

Therefore, in the event of a system crash, for whatever reason, which would have previously resulted in loss of the data 116' and 118' associated with the applications 116 and 118, or which may have corrupted a dll or ini file associated with, or forming a part of, the operating system 112, the data 116' and 118' can be recovered. Furthermore, since it is highly unlikely, in the event of an HDD corrupted operating system dll or ini file, that both the operating system 112' stored on the HDD and the copy 134 of the operating system saved as part of the system memory context data 130 will have suffered the same corruption, the copy 134 of the operating system forming part of the reduced power mode data 130 can be used to recover from a crash that adversely affected the correct functioning of the operating system.

Figure 2:
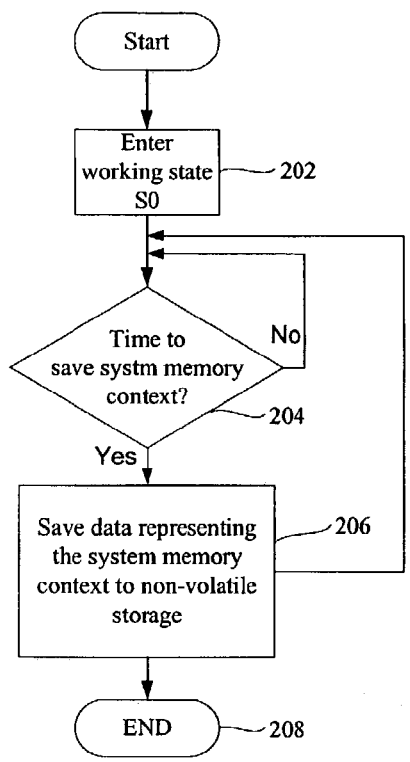
FIG. 2 shows a flowchart of the operation of an embodiment during a working state.

Referring to FIG. 2, there is shown a flowchart 200 of processing performed by the operating system 112 during the working mode, S0, of the client machine 102. The working state, S0, is entered at step 202. A determination is made at step 204 as to whether or not the system memory context 130 should be saved to the HDD 132. In practice the determination would take the form of an interrupt routine that is called periodically or in accordance with a time table to cause the OSPM 114 to save the system memory context 130 to the HDD 132. If the determination is positive, the system memory context 130 is saved to the HDD 132 at step 206. However, if the determination is negative, control returns to step 204 where the client machine 102 awaits the appropriate time to save the system memory context 130 to the HDD 132.

Figure 3:
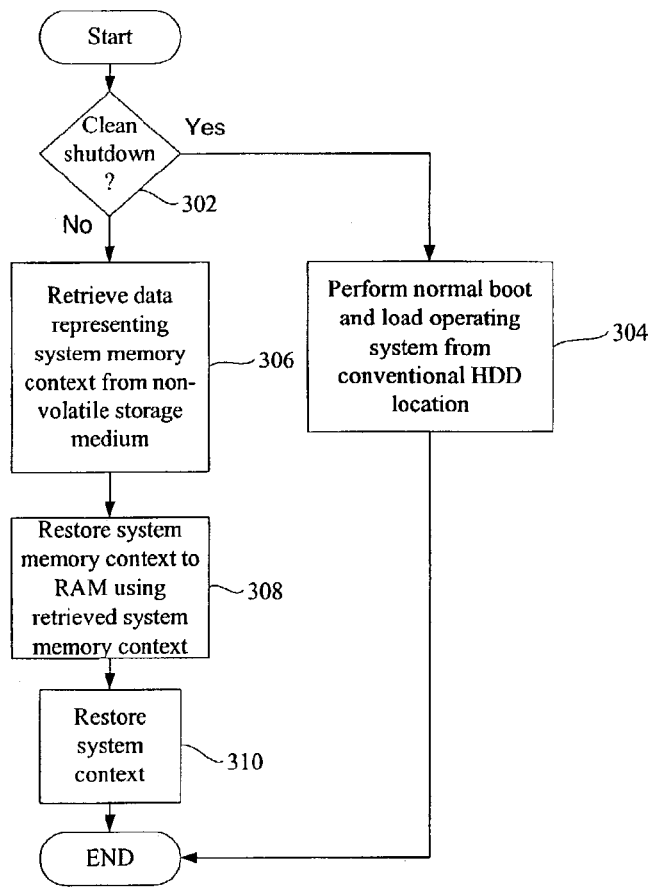
FIG. 3 depicts a flowchart of a recovery process to restore the system memory context following a system crash or power failure that occurred during a working mode according to an embodiment.

FIG. 3 shows a flowchart 300 for restoring the system context upon booting the client machine 102 following a shutdown or crash. At step 302, the BIOS 110 determines whether the CMOS shutdown register 111' indicates that the client machine 102 was correctly or incorrectly shutdown. If the client machine 102 was shutdown correctly, the BIOS 110 continues with the normal POST and boot strapping at step 304. If the client machine 102 was shutdown incorrectly, the BIOS 110 is arranged to retrieve the data 130 representing the system memory context from the HDD 132 at step 306 and to establish a system memory context using that retrieved data 130 at step 308. Having established the system memory context, the system context is established at step 310.

Although the above embodiments have been described with reference to outputting the whole of the system memory context, embodiments are not limited to such an arrangement. Embodiments can be realised in which only a portion of the system memory context is output for storage. For example, selected software, such as the operating system or selected applications, and, optionally, associated data, could be output. Furthermore, embodiments can be realised in which software other than the power management software is arranged to save the system memory context to the HDD.

There has been described a data processing system and method for backing-up and restoring a computer operating system or software. It has been found that a computer crash or power-outage during the working mode, S0, of a computer system, can cause some vital operating system files, stored on the HDD, that were also open at the time of the crash or outage, to become corrupted. The corruption of certain of these files may prevent the computer system from being correctly booted or may prevent the operating system working correctly. Suitably, the embodiments of the present invention are arranged periodically to save the same data to disk that would be saved in preparation for entering a reduced power mode of operation. This data is known as the system memory context. However, the computer system is arranged not to enter the corresponding reduced power mode of operation. That data includes a copy of the operating system and any applications, together with associated data, that were open at the time of saving. Therefore, in the event that an operating system file has become corrupted, a working version of the operating system can be restored from the system memory context stored on the disk.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of operating a data processing system, having a system context, comprising a first storage medium having a current system memory context, which includes data relating to the system context, and a second non-volatile storage medium; the system being operable in a plurality of states, each state having an associated level of system power consumption; and a power management system for saving the system memory context to the second non-volatile storage medium in preparation for entering at least one of the plurality of states; the method comprising the steps of: storing an indication of whether the system has been shutdown correctly or incorrectly; providing a schedule for outputting data representing at least the portion of the current system memory context; executing, during a working state of the plurality of states, an interrupt at intervals determined by the schedule and outputting, using the power management system and in response to the interrupt, data representing at least a portion of the current system memory context for storage on the second storage medium; determining, upon initialisation of the system, from the indication of whether the system has been shutdown correctly or incorrectly, that the system was previously shutdown incorrectly and recovering, in response to that determination, the data from the second storage medium and restoring the system memory context using the recovered data.

2. A method as claimed in claim 1, wherein the step storing an indication of whether the system has been shut down correctly comprises storing the operating system context; and wherein the step of determining, upon initialisation of the system, from the indication of whether the system has been shutdown correctly or incorrectly, that the system was previously shutdown incorrectly comprises attempting, through a BIOS, to load an operating system, and recognizing an unsuccessful load.

3. A method as claimed in claim 1, further comprising the step of invoking the step of outputting the data representing at least the portion of the current system memory context at least twice during a working state.

4. A method as claimed in claim 1, further comprising the step of invoking the step of outputting the data representing at least the portion of the current system memory context at least twice before entering a reduced power consumption state.

5. A back-up method comprising the steps of a method as claimed in claim 1 and in which the current system memory context, or a portion thereof, comprises at least one of an operating system, an application or data associated with the operating system or application.

6. A computer program product comprising a computer readable storage medium having stored thereon a computer program element for implementing a method as claimed in claim 1.

7. A data processing system, having a system context, comprising a first storage medium having a current system memory context, which includes data relating to the system context, and a second non-volatile storage medium; the system being operable in a plurality of states, each state having an associated level of system power consumption; and a power management system to save the system memory context to the second non-volatile storage medium in preparation for entering at least one of the plurality of states; the system further comprising means to store-an indication of whether the system was shutdown correctly or incorrectly; means for providing a schedule according to which periodic interrupts are generated; means to output in response to the period interrupts and using the power management system, during a working state of the plurality of states, data representing at least a portion of the current system memory context for storage on the second storage medium; means to determine, upon initialisation of the system, from the indication that the system was shutdown incorrectly and means, responsive to the determination, to recover-the data from the second storage medium and means to restore the system memory context using the recovered data.

8. A data processing system as claimed in claim 7, further comprising means to establish a schedule for invoking the means to output the data representing at least the portion of the current system memory context and means to invoke the means to output the data representing at least the portion of the current system memory context according to that schedule.

9. A data processing system as claimed in claim 7, further comprising means to invoke the means to output the data representing at least the portion of the current system memory context at least twice during a working state.

10. A data processing system as claimed in claim 7, further comprising means to invoke the means to output the data representing at least the portion of the current system memory context at least twice before entering a reduced power consumption state.

11. A back-up system comprising a system as claimed in claim 7, in which the current system memory context, or a portion thereof, comprises at least one of an operating system, an application or data associated with the operating system or application.

* * * * *